United States Patent

Watanabe

[11] Patent Number: 5,898,551
[45] Date of Patent: Apr. 27, 1999

[54] MAGNETIC DISK CARTRIDGE

[75] Inventor: Seiichi Watanabe, Kanagawa-ken, Japan

[73] Assignees: Fuji Photo Film Co., Ltd., Tokyo, Japan; Iomega Corporation, Roy, Utah

[21] Appl. No.: 08/686,919
[22] Filed: Aug. 1, 1996
[51] Int. Cl.[6] .................................................. G11B 23/03
[52] U.S. Cl. ............................................................ 360/133
[58] Field of Search ............................ 360/133; 369/291

[56] References Cited

U.S. PATENT DOCUMENTS

| 4,503,474 | 3/1985 | Nigam | 360/133 |
|---|---|---|---|
| 4,743,989 | 5/1988 | Bauck et al. | 360/133 |
| 4,794,480 | 12/1988 | Jones et al. | 360/99.04 |
| 4,901,173 | 2/1990 | Jones et al. | 360/99.04 |
| 5,034,844 | 7/1991 | Shiba et al. | 369/291 |
| 5,323,382 | 6/1994 | Takahashi | 360/133 |
| 5,467,239 | 11/1995 | Fujisawa | 360/133 |
| 5,537,281 | 7/1996 | Ma et al. | 360/133 |
| 5,689,393 | 11/1997 | Wanatabe | 360/133 |

FOREIGN PATENT DOCUMENTS

| 0494794 | 7/1992 | European Pat. Off. | 369/291 |
|---|---|---|---|
| 62-89287 | 4/1987 | Japan . | |
| 2193377 | 7/1990 | Japan . | |
| 620428 | 1/1994 | Japan . | |
| 6103720 | 4/1994 | Japan | 360/133 |
| 2124819 | 2/1984 | United Kingdom | 360/133 |

*Primary Examiner*—Allen Cao
*Attorney, Agent, or Firm*—Sughrue, Mion, Zinn, Macpeak & Seas, PLLC

[57] ABSTRACT

A magnetic disk cartridge has a magnetic head access opening formed radially from a portion of one side surface of a cassette shell to extend from the top surface through the side surface to the bottom surface thereof. A slidable shutter member for opening and closing the magnetic head access opening is provided to be slidable on the cassette shell. The shutter member is constituted as a sectionally ⊔-shaped sheet member comprising, as interconnected, an upper wing for covering the portion of the magnetic head access opening at the top surface, a shutter section for covering the portion of the magnetic head access opening at the side surface and a lower wing for covering the portion of the magnetic head access opening at the bottom surface. The magnetic head access opening is opened and closed by sliding the shutter member back and forth along these surfaces. The structure provides the cassette shell with adequate strength to resist deformation at the magnetic head access opening and ensures smooth sliding of the shutter member on the cassette shell.

6 Claims, 5 Drawing Sheets

MAGNETIC DISK CARTRIDGE

BACKGROUND OF THE INVENTION

1. Field of the Invention

The present invention relates to a magnetic disk cartridge and, more particularly to an improved magnetic head access opening and shutter structure in a magnetic disk cartridge having a rotatable magnetic disk encased in a cassette shell.

2. Description of the Related Art

A magnetic disk cartridge comprises a magnetic disk for magnetically recording analog and/or digital signals rotatably encased in a thin cassette shell. The cassette shell is formed in the shape of a flat prism (substantially a hexahedron) with a top surface slightly larger than the magnetic disk, a bottom surface having an opening through which a center core supporting the center of the magnetic disk is exposed and narrow side surfaces extending between the outer peripheral edges of the top and bottom surfaces. The magnetic disk cartridge is provided with a magnetic head access opening for insertion/withdrawal of magnetic heads used for magnetic recording and reproducing so as to enable the magnetic heads to be brought into contact with, or close to, the opposite surfaces of the magnetic disk from the exterior. The magnetic head access opening is equipped with a shutter for preventing invasion of dust and the like when the opening is not in use.

The magnetic head access opening of the prior art magnetic disk cartridge is a slender opening of substantially rectangular shape formed in the top and bottom surfaces of the cassette shell to extend in the radial direction of the magnetic disk. The shutter member for opening/closing the magnetic head access opening is a piece of thin sheet metal of ⌴-shaped section which extends along both the top and bottom surfaces of the cassette shell and also over the side surface between them. The top and bottom surfaces of the cassette shell are formed with shallow recesses constituting stepped regions for accommodating and guiding the shutter member. The portions of the shutter member opposite the top and bottom surfaces of the cassette shell are formed with windows that are slightly larger than the magnetic head access opening in the top and bottom surfaces of the cassette shell. The magnetic head access opening is opened and closed by sliding the shutter member along the surfaces of the cassette shell.

However, it is not absolutely necessary for the magnetic head access opening to be formed in the top and bottom surfaces of the cassette shell to extend in the radial direction of the magnetic disk. Specifically, it can be configured at any location and in any shape so long as it enables the magnetic heads to be brought in contact with, or close to, the opposite surfaces of the magnetic disk over the full radius thereof from the exterior.

The ability to fabricate smaller magnetic heads has afforded greater freedom in the positioning and sizing of the magnetic head access opening and has even made it possible to provide the opening only in a side surface rather than in the top and/or bottom surface. This can be achieved by forming the narrow side surface of the cassette shell with a magnetic head access opening of a size enabling access to the opposite surfaces of the magnetic disk from the exterior and inserting/withdrawing thin, arm-shaped pickups having tiny magnetic heads attached at their tips through this hole to conduct recording and reproduction while moving the pickup in the radial direction of the magnetic disk.

Although a magnetic disk cartridge having a magnetic head access opening of this type can be equipped with a shutter member similar to that of the prior-art magnetic disk cartridge, adoption of the same structure causes problems. This is because the shallow recesses formed in the top and bottom surfaces of the cassette shell as stepped regions for guiding the shutter member, reduce the thickness of the main walls of the cassette shell to the extent that the main wall thicknesses at the portion where the magnetic head access opening is provided in the side wall of the cassette shell become so extremely thin as to make the magnetic head access opening susceptible to deformation during fabrication of the cassette shell or during use of the magnetic disk cartridge. The extreme thinness of the main walls at this portion also degrades the strength of the magnetic disk cartridge. Deformation of the magnetic head access opening portion prevents the shutter member slidably mounted on the cassette shell from sliding smoothly. This is liable to make opening and closing of the shutter member difficult or impossible.

SUMMARY OF THE INVENTION

The object of this invention is to overcome the aforesaid problems by providing a magnetic disk cartridge whose magnetic head access opening does not easily deform, which exhibits stable strength, and whose shutter member slidably mounted on the cassette shell is always able to slide smoothly.

For achieving this object, the present invention provides a magnetic disk cartridge comprising a cassette shell formed as a flat prism with a top surface slightly larger than a magnetic disk encased in the cassette shell, a bottom surface parallel to the top surface and narrow side surfaces extending between outer peripheral edges of the top and bottom surfaces, a magnetic head access opening formed like a notch into the top surface, one side surface and the bottom surface of the cassette shell for enabling magnetic recording and reproducing heads to be brought in contact with, or close to, opposite surfaces of the magnetic disk from the exterior, and a shutter member having a ⌴-shaped section formed by interconnecting an upper wing, a shutter section and a lower wing that extend respectively along said top, one side and bottom surfaces, the shutter member being provided on the cassette shell to be slidable along said surfaces for opening and closing the magnetic head access opening.

The shutter member can be provided with biasing means for urging it in the direction of closing the magnetic head access opening.

DESCRIPTION OF THE PREFERRED EMBODIMENTS

The magnetic disk cartridge of the present invention will hereinbelow be described with reference to the accompanying drawings.

Figure 1:
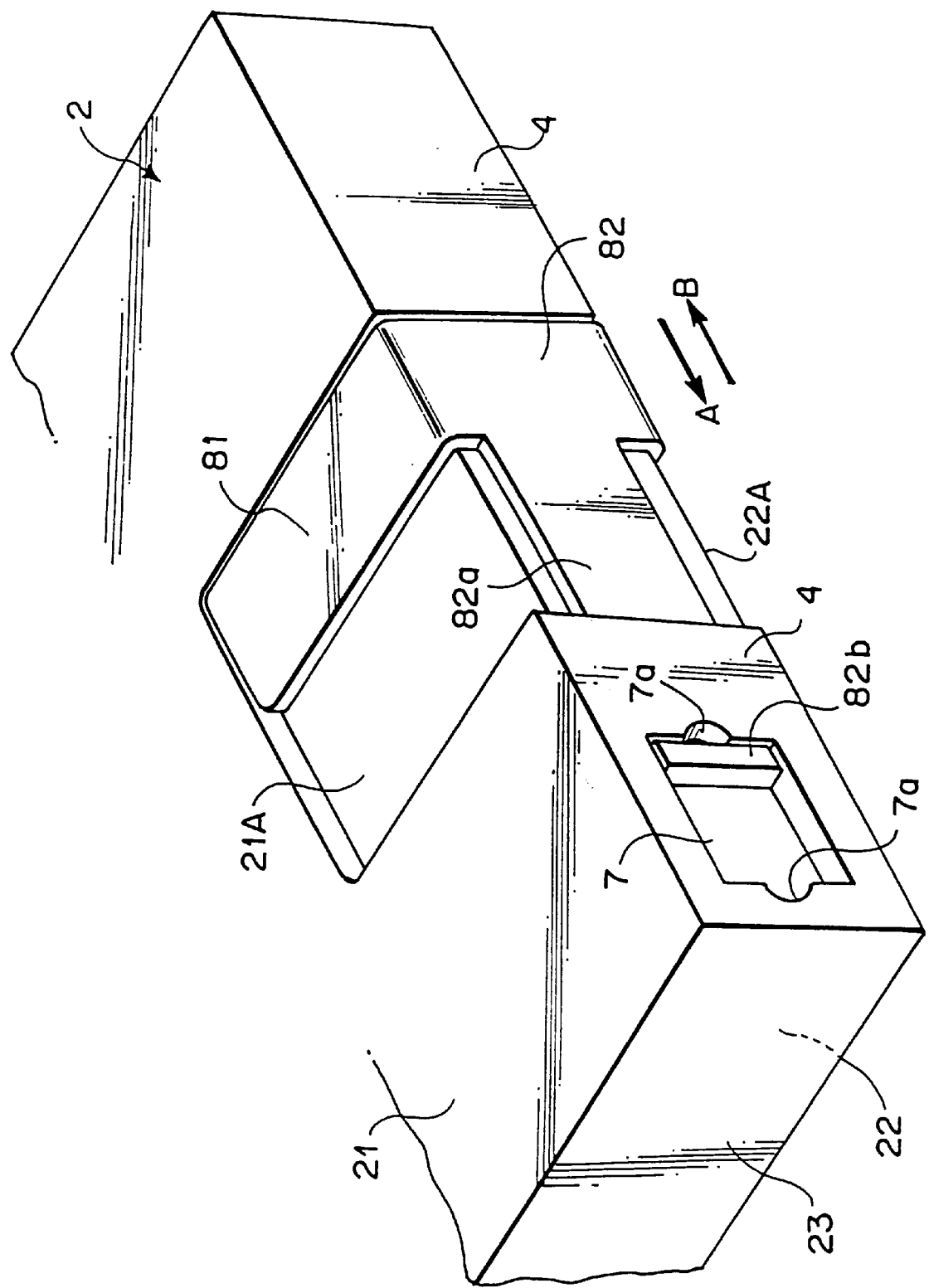
FIG. 1 is a partial perspective view of a magnetic disk cartridge which is a first embodiment of the invention shown with its shutter member closed.
Figure 2:
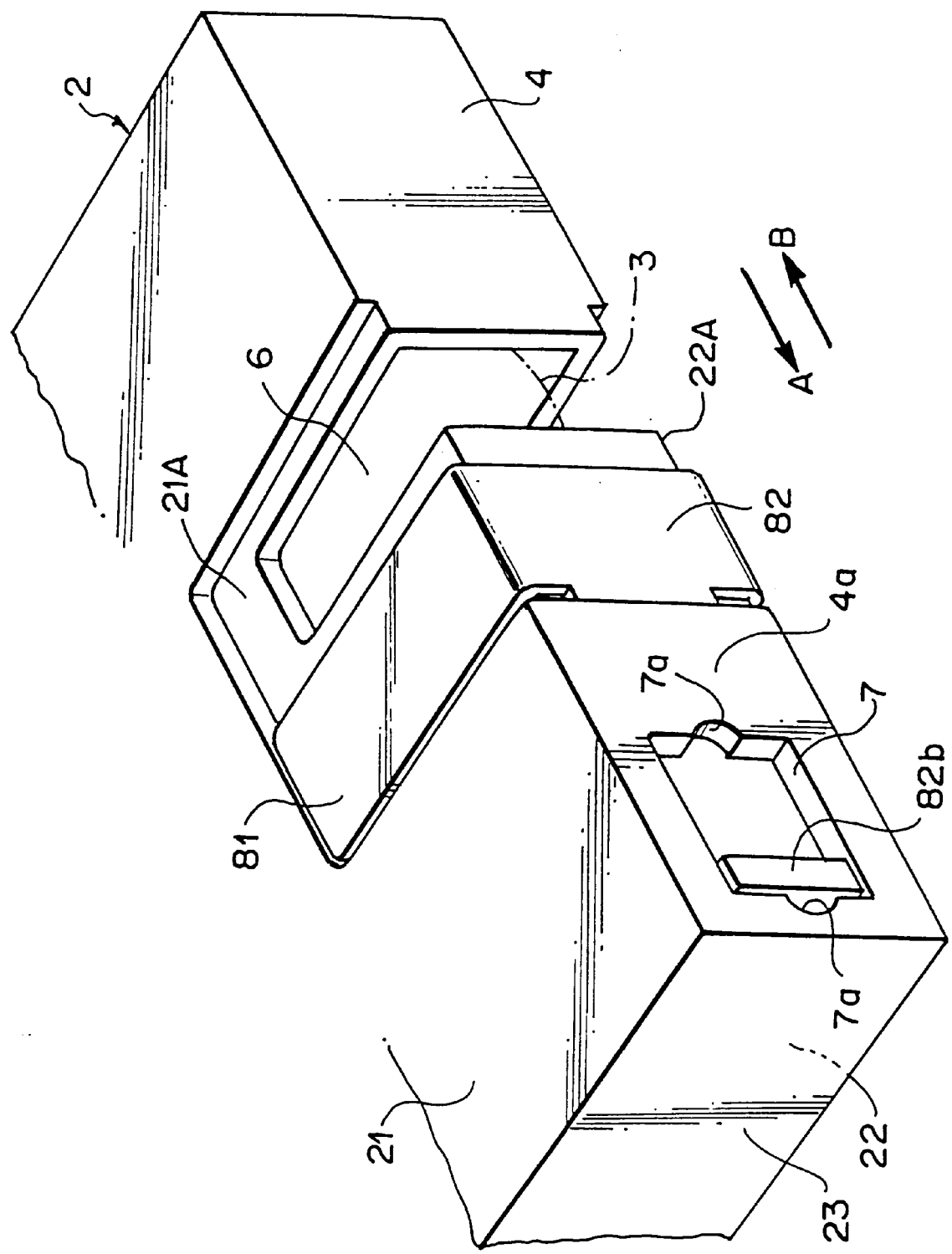
FIG. 2 is a partial perspective view of the first embodiment of the magnetic disk cartridge shown with its shutter member open.
Figure 3:
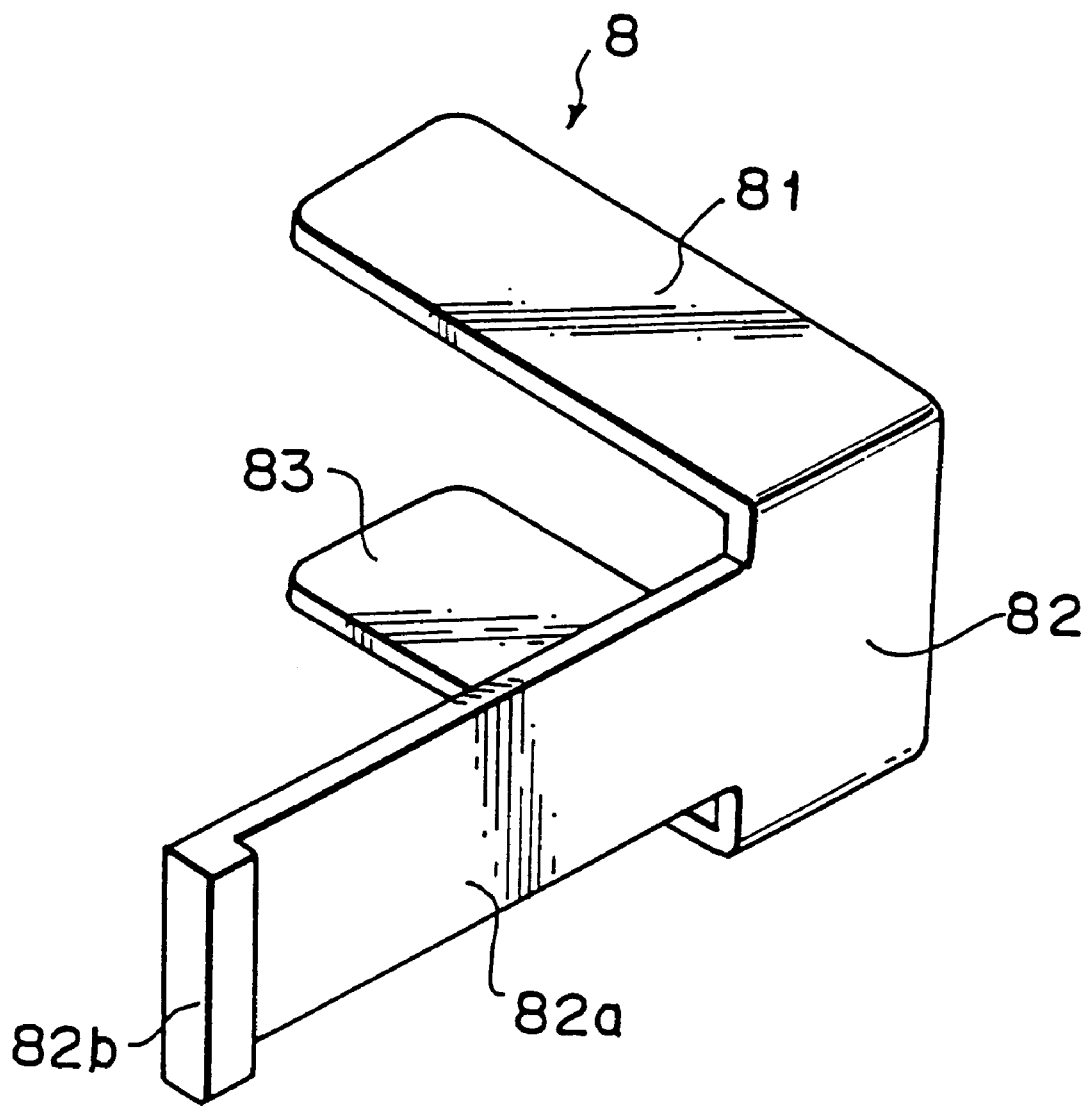
FIG. 3 is a perspective view of the shutter member of the first embodiment.

FIGS. 1 and 2 are partial perspective views showing a magnetic disk cartridge which is a first embodiment of the invention. The magnetic disk cartridge is shown with its shutter member closed in FIG. 1 and open in FIG. 2. FIG. 3 shows the shutter member by itself.

The magnetic disk cartridge comprises a cassette shell 2 encasing a magnetic disk 3 (indicated by a chain line in FIG. 2) so as to be freely rotatable therein. While the cassette shell 2 appears to be seamless in the figures, like the cassette shell of the prior-art magnetic disk cartridge it is formed of a pair of top and bottom cassette shell halves made of molded plastic. The cassette shell 2 is formed substantially as a flat hexahedron having an approximately square top surface 21 slightly larger than magnetic disk 3, a bottom surface 22 of substantially the same shape as the top surface 21 and lying parallel thereto, and narrow side surfaces 23 extending between the outer peripheral edges of the top surface 21 and the bottom surface 22.

A notch-like magnetic head access opening 6 (FIG. 2) enabling magnetic recording and reproducing heads to be brought in contact with, or close to, the opposite surfaces of the magnetic disk from the exterior is formed radially from a portion of one side surface 4 among the four side surfaces 23 of the cassette shell 2 to extend from the top surface 21 through the side surface 4 to the bottom surface 22.

A slidable shutter member 8 for opening and closing the magnetic head access opening 6 is provided on the cassette shell 2. The shutter member 8 is constituted as a sectionally ⌐-shaped sheet member comprising, as interconnected, an upper wing 81 extending along the top surface 21 and covering the portion of the magnetic head access opening 6 at the top surface 21, a shutter section 82 extending along the side surface 4 and covering the portion of the magnetic head access opening 6 at the side surface 4 and a lower wing 83 extending along the bottom surface 22 and covering the portion of the magnetic head access opening 6 at the bottom surface 22. The magnetic head access opening 6 is opened and closed by sliding the shutter member 8 back and forth along these surfaces.

The shutter section 82 of the shutter member 8 for covering the portion of the magnetic head access opening 6 at the side surface 4 of the cassette shell 2 has an extension 82a extending along the side surface 4 and the side surface 4 is provided with a guide section 4a having a gap for receiving and guiding the extension 82a of the shutter section 82 so as to enable the shutter member 8 to slide along the surfaces of the cassette shell 2.

The top surface 21 and the bottom surface 22 of the cassette shell 2 are formed with recesses 21A, 22A for respectively receiving and guiding the upper wing 81 and lower wing 83 of the shutter member 8. The shutter member 8 slides within the recesses 21A, 22A. A similar recess can also be formed in the side surface 4. (The side surface 4 is not formed with a recess in the illustrated configuration.)

The mechanism for sliding the shutter member 8 along the surface of the cassette shell 2 provided in the device in which the magnetic disk cartridge is used (i.e., the mechanism comprising a guide groove, a guide leg engaged with the guide groove, and the like) can be of the same type as provided in devices for using the prior art magnetic disk cartridge.

In the embodiment described above, the tip of the extension 82a of the shutter section 82 is formed with an engagement member 82b for engagement with an operating member of the device. The engagement member 82b is exposed to the exterior through an oblong opening 7 formed in the guide section 4a for receiving and guiding the extension 82a of the shutter section 82. The operating member of the device can therefore engage with the engagement member 82b. In addition, the oblong opening 7 is provided at its opposite ends with engagement facilitating notches 7a for expediting engagement between the operating member of the device and the engagement member 82b.

The magnetic disk cartridge of this structure is used in the same manner as the prior-art magnetic disk cartridge. Specifically, it is loaded into the magnetic recording and reproducing device (hereinafter called simply "device") in the state shown in FIG. 1, i.e. with the magnetic head access opening 6 closed by the shutter member 8, by a pushing operation for insertion. At this time, the operating member provided in the device responds to the loading operation by sliding the shutter member 8 in the A direction to the open position shown in FIG. 2. Then, when the operator performs a prescribed operation for removing the magnetic disk cartridge from the device, for instance, when the operator presses a prescribed operating button of the device, the operating member of the device responds by sliding the shutter member 8 in the B direction to the closed position shown in FIG. 1. Since various types of device side mechanisms are available for conducting the opening and closing operations of the shutter member 8 and such a mechanism can easily be constituted as in conventional devices, a detailed explanation of such a mechanism will not be given here.

To facilitate the opening and closing operations of the shutter member 8, particularly that in the closing direction, the cassette shell 2 is preferably provided with biasing means (e.g., a spring) for urging the shutter member 8 in the closing direction. Since such a biasing means also serves to retain the shutter member 8 in the closed position at all times when the cartridge is not in use, its provision is also preferable from the viewpoint of preventing invasion of dust and the like.

In the embodiment of the magnetic disk cartridge described in the foregoing, the shutter section 82 of the shutter member 8 for covering a portion of the magnetic head access opening 6 has the extension 82a extending along the side surface 4 of the cassette shell 2 and the cassette shell 2 is provided with the guide section 4a having a gap for receiving and guiding the extension 82a so as to enable the shutter member 8 to slide freely. The required slidability of the shutter member 8 can, however, be secured even without providing the shutter section 82 with the extension 82a. The second embodiment of the invention shown in FIGS. 4 and 5 is a case in point.

Figure 4:
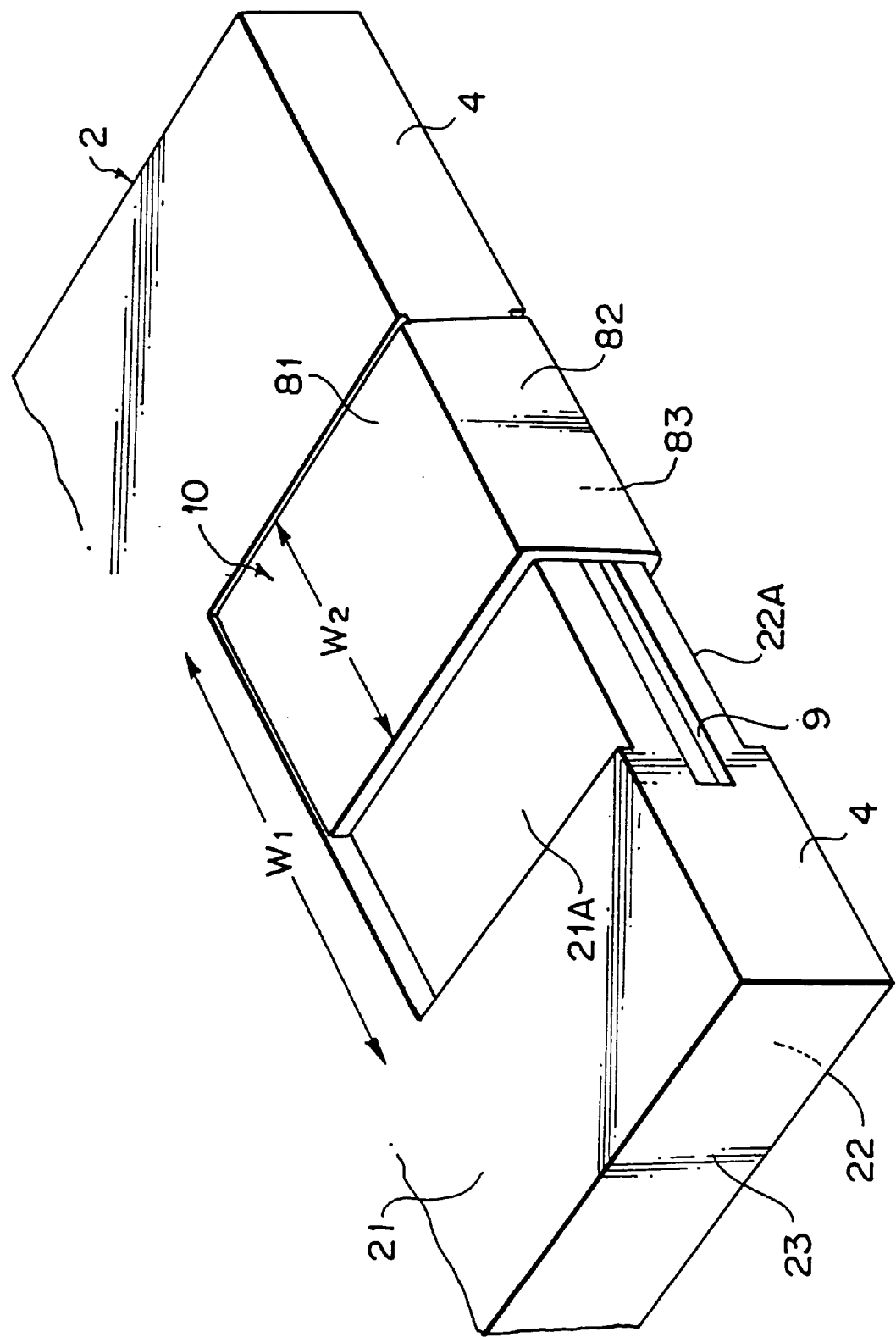
FIG. 4 is a partial perspective view of a magnetic disk cartridge which is a second embodiment of the invention shown with its shutter member closed.
Figure 5:
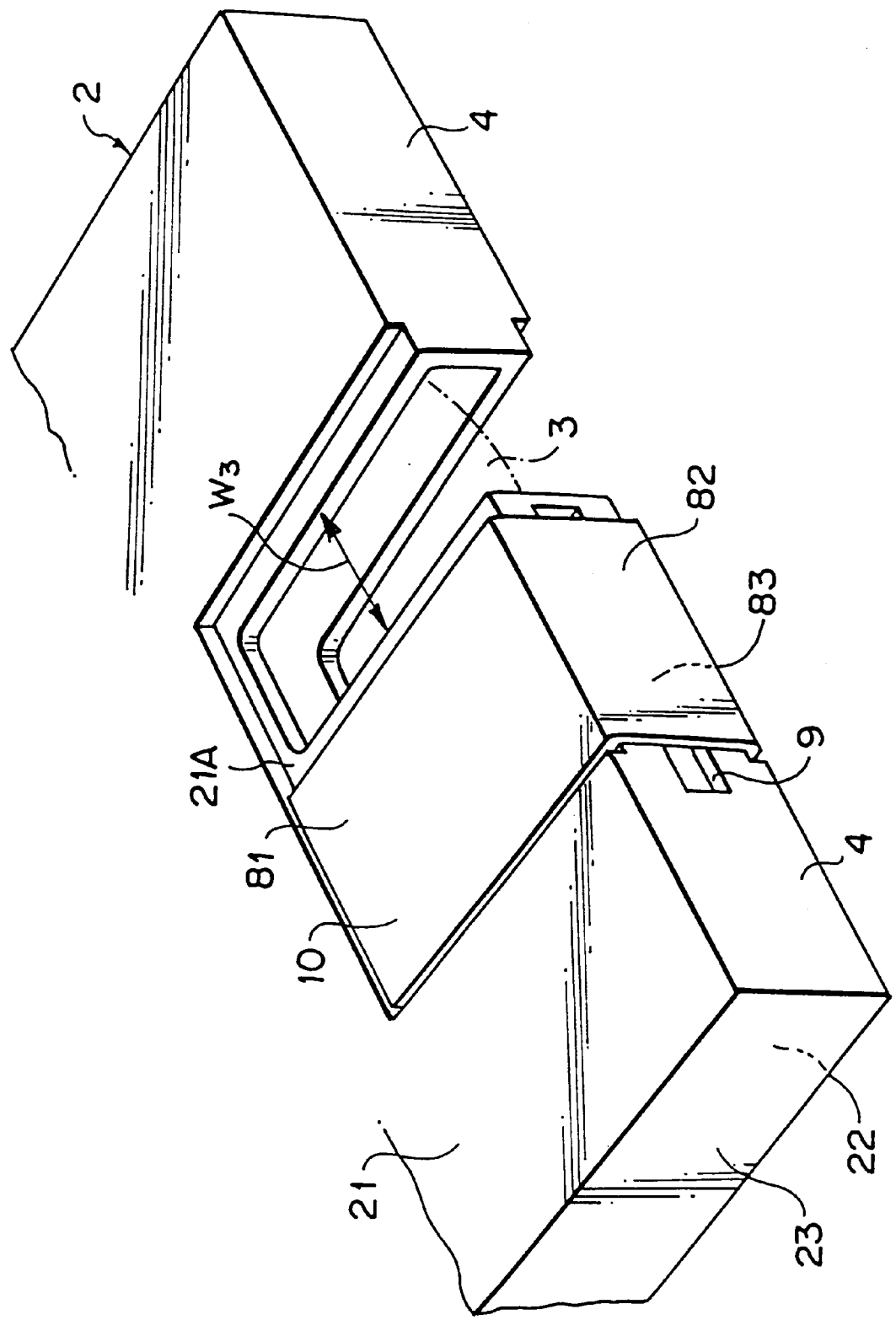
FIG. 5 is a partial perspective view of the second embodiment of the magnetic disk cartridge shown with its shutter member open.

The components in FIGS. 4 and 5 which are the same as those in FIGS. 1 to 3 are assigned the same reference symbols as those FIGS. 1 to 3 and will not be explained further.

This embodiment uses a shutter member 10 which is somewhat wider than the shutter member 8 of the first embodiment. Unlike the shutter member 8 of the first embodiment, the shutter member 10 has no extension 82a and is of a simple square shape with a ⌐-shaped section. It is formed with a guide leg (not shown) that fits into and is guided by a guide groove 9 formed in the side surface 4 and urged into the closed position shown in FIG. 4 by a spring (not shown).

In this second embodiment, the upper wing 81, the shutter section 82 and the lower wing 83 of the shutter member 10 all have the same width W2. The width W2 naturally has to be smaller than the width W1 of the recess 21A and greater than the width W3 of the magnetic head access opening 6. In order to ensure complete opening of the magnetic head access opening 6 when the shutter member 10 is in the position shown in FIG. 5, moreover, it also has to be smaller than the difference between the width W1 of the recess 21A and the width W3 of the magnetic head access opening 6 (W1−W3). In other words, the width W2 of the shutter member 10 is required to satisfy the two conditions $$W1 > W2 > W3 \quad (1)$$

$$W1 - W3 > W2 \quad (2).$$

When the magnetic disk cartridge of this second embodiment is loaded in the device with the shutter member 10 closed, the operating member provided in the device responds to the loading operation by sliding the shutter member 10 to the open position. Then, when the operator performs a prescribed operation for removing the magnetic disk cartridge from the device, for instance, when the operator presses a prescribed operating button of the device, the operating member of the device responds by sliding the shutter member 10 to the closed position.

In order to stabilize retention of the shutter member in the open position, either of the aforesaid two embodiments can be provided on portions of the inner surface of the shutter member and the outer surface of the cassette shell in sliding contact with each other with a projection and an indentation that are mutually engageable for providing a click-stop effect. This enhancement increases the freedom with which the operating mechanism of the device can be designed.

Since the magnetic head access opening of the magnetic disk cartridge according to this invention is formed like a notch into the top surface, one side surface and the bottom surface of the cassette shell, the wall thickness of the cassette shell does not become thin in the vicinity the magnetic head access opening so that smooth sliding of the shutter is safe from hindrance by deformation of a thin-wall portion.

Moreover, since the magnetic head access opening is formed like a notch into the top surface, one side surface and the bottom surface of the cassette shell, the mechanism provided in the device in which the magnetic disk cartridge is used for bringing the magnetic heads into contact with, or close to, the magnetic disk from the exterior can be designed with a high degree of freedom and can therefore be designed more easily. This will be understood by, for instance, considering the case where a mechanism is to be provided for moving the magnetic heads radially inward of the magnetic disk from outside its outer periphery. If the periphery of the opening is at the outer periphery of the magnetic disk as in the prior-art magnetic disk cartridge, the side wall at this portion becomes an obstacle preventing movement of the magnetic head radially inward from outside the outer periphery of the magnetic disk. In this invention, however, the magnetic head access opening is formed like a notch into the top surface, one side surface and the bottom surface of the cassette shell, which is advantageous from the point that no obstacle is present in such a case.

What is claimed is:

1. A magnetic disk cartridge comprising:
    a cassette shell rotatably encasing a magnetic disk and formed as a flat prism with a top surface slightly larger than the magnetic disk, a bottom surface of substantially the same shape as the top surface and lying parallel thereto and narrow side surfaces extending between outer peripheral edges of the top and bottom surfaces;
    a notch-shaped magnetic head access opening formed in the top surface, one of the narrow side surfaces and the bottom surface of the cassette shell for enabling magnetic recording and reproducing heads to be brought in contact with, or close to, opposite surfaces of the magnetic disk from the exterior, wherein the notch-shaped magnetic head access opening includes a top portion which extends through the top surface, a side portion which extends through the one of the narrow side surfaces, and a bottom portion which extends through the bottom surface, the top portion, the side portion and the bottom portion of the notch-shaped magnetic head access opening being continuously connected with each other, the top portion and the bottom portion of the notch-shaped magnetic head access opening extending back an equal distance from the one of the narrow side surfaces; and
    a shutter member including:
        an upper wing extending along the top surface for covering the top portion of the notch-shaped magnetic head access opening;
        a shutter section extending along the one of the narrow side surfaces for covering the side portion of the notch-shaped magnetic head access opening; and
        a lower wing extending along the bottom surface for covering the bottom portion of the notch-shaped magnetic head access opening, the shutter member being provided on the cassette shell to be slidable along said surfaces for opening and closing the notch-shaped magnetic head access opening;
        wherein the shutter member has a ⊔-shaped section formed by interconnecting said upper wing, said shutter section, and said lower wing, wherein said shutter section of the shutter member for covering the side portion of the notch-shaped magnetic head access opening of the cassette shell has an extension extending along the one of the narrow side surfaces, and the one of the narrow side surfaces is provided with a guide section having a gap for receiving and guiding the extension of said shutter section to enable the shutter member to slide along the surfaces of the cassette shell.

2. A magnetic disk cartridge as defined in claim 1, wherein the top surface and the bottom surface of the cassette shell are formed with recesses for receiving and guiding the upper wing and the lower wing of the shutter member.

3. A magnetic disk cartridge as defined in claim 1 or 2, further comprising biasing means for urging the shutter member in the direction of closing the magnetic head access opening.

4. A magnetic disk cartridge according to claim 1, further comprising:
    an engagement member formed on a distal end of the extension of said shutter section;
    an opening in said guide section for receiving and guiding said engagement member, wherein said engagement member is exposed to the exterior through said opening.

5. A magnetic disk cartridge according to claim 4, wherein said opening is provided with engagement facilitating notches at its opposite ends, for expediting engagement with at least said engagement member.

6. A magnetic disk cartridge according to claim 1, wherein the one narrow side surface is formed with a guide groove for guiding the shutter member to enable the shutter member to slide along the surfaces of the cassette shell.

* * * * *